A. H. THORP.
FLUID TRAP.

No. 188,440. Patented March 13, 1877.

Witnesses:
Henry Eichling
Edward Holly

Inventor:
Alfred H. Thorp
per
James A. Whitney
Atty.

N. PETERS, PHOTO-LITHOGRAPHER, WASHINGTON, D.C.

UNITED STATES PATENT OFFICE.

ALFRED H. THORP, OF NEW YORK, N. Y.

IMPROVEMENT IN FLUID-TRAPS.

Specification forming part of Letters Patent No. 188,440, dated March 13, 1877; application filed November 14, 1876.

*To all whom it may concern:*

Be it known that I, ALFRED H. THORP, of the city, county, and State of New York, have invented an Improvement in Fluid-Traps, of which the following is a specification:

The ordinary liquid-trap is liable to be rendered inoperative either by the siphoning out of the trap by suction from without, or by the lowering of the liquid-level in the outer side of the trap by atmospheric pressure from without until said liquid-level reaches the level at which the gases can pass into the inner side of the trap, and rise or bubble up through the water.

The object of this invention is to prevent this; and to this end the said invention consists in a fluid-trap enlarged at the side adjacent to the outlet, in such manner as to enable said side to contain a very much larger quantity of liquid than the side adjacent to the inlet, the greater surface of liquid exposed in the one side of the trap as compared with that in the other side insuring, as a result of atmospheric pressure upon the larger surface, a proportionally-increased rise or lift of liquid in the smaller part of the trap, and consequently a greater resistance to the passage of gases, this construction of the trap, moreover, causing any outflow of liquid from the enlarged portion of the trap to exert a less effect in lowering the liquid in the apparatus, and thereby preventing the inward passage of gases. It will be seen from this that by my improved construction of the trap the passage inward of gases through the trap is effectually guarded against.

Figure 1:
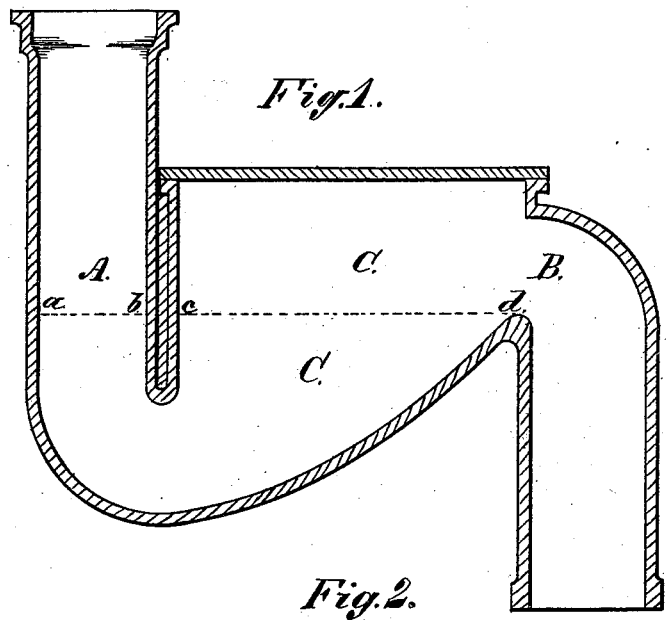
Figure 2:
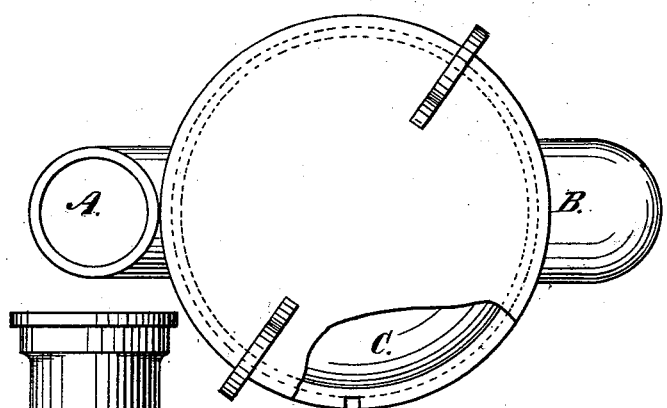
Figure 3:
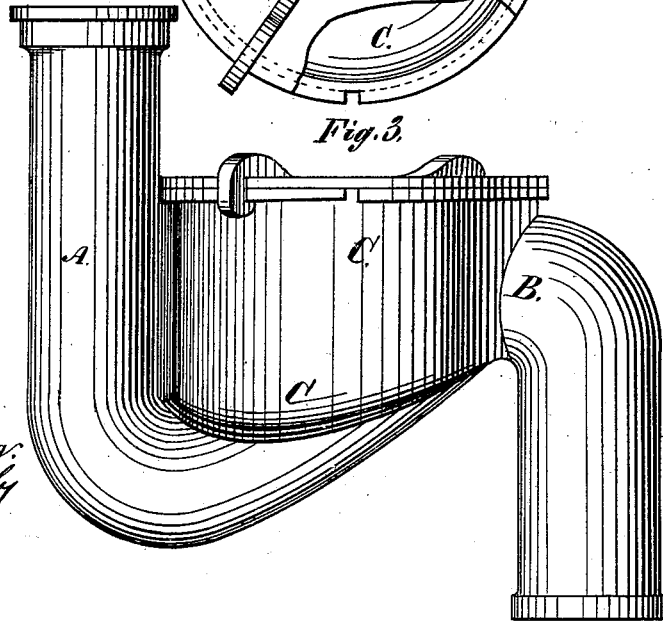

Figure 1 is a longitudinal section of a trap made according to my invention. Fig. 2 is a plan view of the same, and Fig. 3 a side view of the same.

A is the inlet of the trap, B the outlet, and C that part of the trap adjacent to the outlet. The surface of the liquid at the inlet part A is indicated by the dotted line *a b*. That of the liquid-surface of the enlarged part C is indicated by dotted line *c d*.

It will be seen that the liquid-surface of the last-named part, C, is much greater than that of the inlet A. Now, if we assume an atmospheric pressure upon the liquid-surface *c d* which will force the same down to any given extent—say one-quarter of an inch—the rise of the column of liquid in the inlet A will be greater than the fall of the liquid in the part C, in the same proportion as the volume of liquid in said one-quarter of an inch in height of part C is greater than the volume of liquid in one-quarter of an inch in height of part A. For example, if the atmospheric pressure from without upon the surface *c d* depresses the same one-quarter of an inch, and the volume of liquid thus depressed is nine times greater than the volume of liquid contained in one-quarter of an inch in height in part A, the liquid-level in the part A will be raised two and one-quarter inches, and this greatly-increased height of the liquid in part A will exert a proportionally-increased resistance to the passage of gases inward. Now, on the other hand, suction from the side of the outlet B can only withdraw from the part C a portion of liquid equal to that contained in the part A above the level at which air from the inside can be freely drawn; and when the suction is removed, as I have described above, the rise of the liquid-level in the part A will be about nine times greater than the fall of the liquid-level in the part C, which will leave the liquid in the apparatus nearly, though not quite, at its original height, and its power of resistance to the passage of gases remains substantially the same as before.

It will therefore be seen that if siphoning occur in the trap the liquid left in the outer side of the trap will be more than sufficient to refill the smaller inner side of the trap—in other words, the part adjacent to the inlet A—and thus re-establish the efficacy of the trap.

It will also be seen that the ordinary resistance to atmospheric pressure from without will be multiplied by the number of times that the surface of the fluid exposed in the outer side of the trap—*i. e.*, that adjacent to the outlet B—exceeds that exposed in the inner side of the trap—*i. e.*, that adjacent to the inlet A—thereby insuring the advantageous result hereinbefore described as resulting therefrom.

What I claim as my invention is—

A fluid-trap having its holding capacity enlarged at the side adjacent to the outlet B, presenting a larger surface of liquid adjacent to said outlet than that presented in the side adjacent to the inlet A of the trap, all substantially as and for the purpose herein set forth.

ALFRED H. THORP

Witnesses:
EDWARD HOLLY,
H. WELLS, Jr.